July 11, 1944.  F. S. DEXTER  2,353,551
EVAPORATOR
Filed Oct. 22, 1940   3 Sheets-Sheet 1

INVENTOR.
FRED S. DEXTER.
BY
Henry Gifford Hardy
ATTORNEY.

July 11, 1944.  F. S. DEXTER  2,353,551
EVAPORATOR
Filed Oct. 22, 1940  3 Sheets-Sheet 2

INVENTOR.
FRED S. DEXTER
BY
ATTORNEY

July 11, 1944.  F. S. DEXTER  2,353,551
EVAPORATOR
Filed Oct. 22, 1940  3 Sheets-Sheet 3

INVENTOR.
FRED S. DEXTER.
BY Henry Gifford Hardy
ATTORNEY.

Patented July 11, 1944

2,353,551

UNITED STATES PATENT OFFICE 2,353,551

EVAPORATOR

Fred S. Dexter, Berkeley, Calif., assignor to Dorward & Sons Company, a corporation of California Application October 22, 1940, Serial No. 362,241

6 Claims. (Cl. 202—64)

The invention relates to the separation of liquids, especially solvent extraction processes for oils, and is particularly concerned with an evaporator for separating a solvent from an oil. The device of the present invention has distinct capabilities for the handling of very viscous oils.

This evaporator forms one portion of the complete apparatus for processing oils whether polymerized or not in the course of the process.

The evaporator comprises, in broad terms, a conical evaporating surface over which the oil may be spread in a very thin and continuously thinning layer for heating, a venting system to carry off the evaporated solvent, a drainage system to collect the treated fractions of the oil, and a heating system to produce the evaporation.

As indicated by the prior art, it has been very difficult to separate solvents, such as acetone, from the oil fractions because of the tenacious oil film which surrounds each vapor bubble as it is formed. The problem has been met, as here disclosed, by spreading a very thin layer of the solution over a conical surface heated in any suitable manner, and utilizing the tendency of the oil to creep over a surface to create a thinner layer and so provide what may be very inaccurately described as mechanical stretching. The solution travels by gravity flow down the cone, and as the cone area increases downwardly, the material creeps over it to cover the increasing area. This creeping in effect stretches the oil film thinner as it proceeds.

The thinner the film can be stretched, the more intimately it can be brought into contact with the heating surface. A thinner film brings about a more even heat input. Likewise the thinner the film the lower the surface tension between the solvent and the oil decreasing the stable foaming and reducing the bubble forming tendency of vapors under thick film conditions and heat. It also reduces the tendency of the oil to hold the bubbles in suspension by its strong surface tension so that they are carried along with the oil rather than vaporizing freely. It also permits more complete separation of the liquids by substantially lesser degrees of heat. When the oil has been drained off and the solvent separately collected, the oil may be treated again to produce the exact purity required, or stored for future use is the device is not run to accomplish its real efficiency. The invention may be better understood by reference to the drawings, wherein the apparatus has been set forth in detail.

Among the objects of the invention are to provide a more satisfactory evaporator unit for separating solvents from oils, or two liquids having different degrees of vaporization; to insure evaporation of all the solvent from an oil; to cut down surface tension eliminating bubbles in the treating of oil; to overcome the effect of surface tension in holding occluded solvent or other liquid; to spread a mixture of solvent and oil or any two liquids in a controllable thickness over evaporating means; and to provide in general an accurately controllable process for removing any desired percentage of solvent from an oil dissolved or partially dissolved therein.

Other objects and advantages will be apparent as the nature of the same is more fully understood from the following description and accompanying drawings wherein is set forth what are now considered to be preferred embodiments of the invention.

Figure 1:
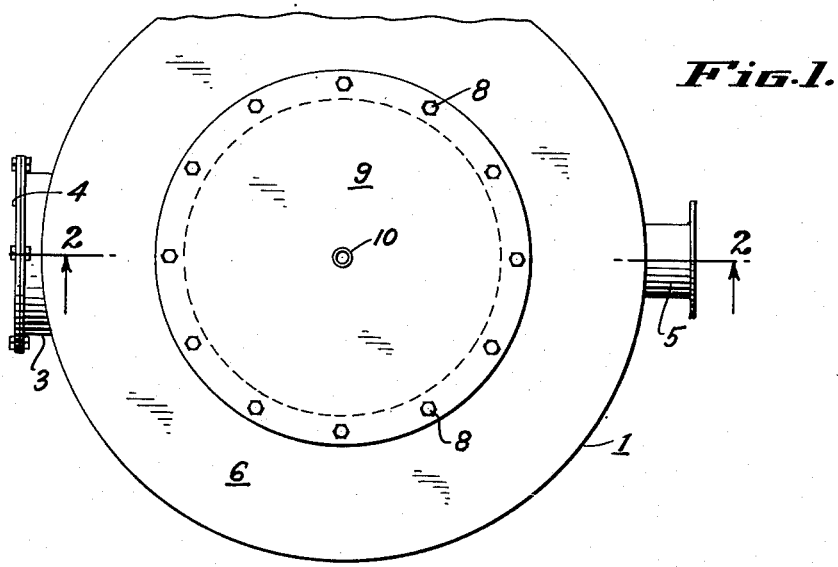
Fig. 1 is a top view of a preferred form of the device.
Figure 2:
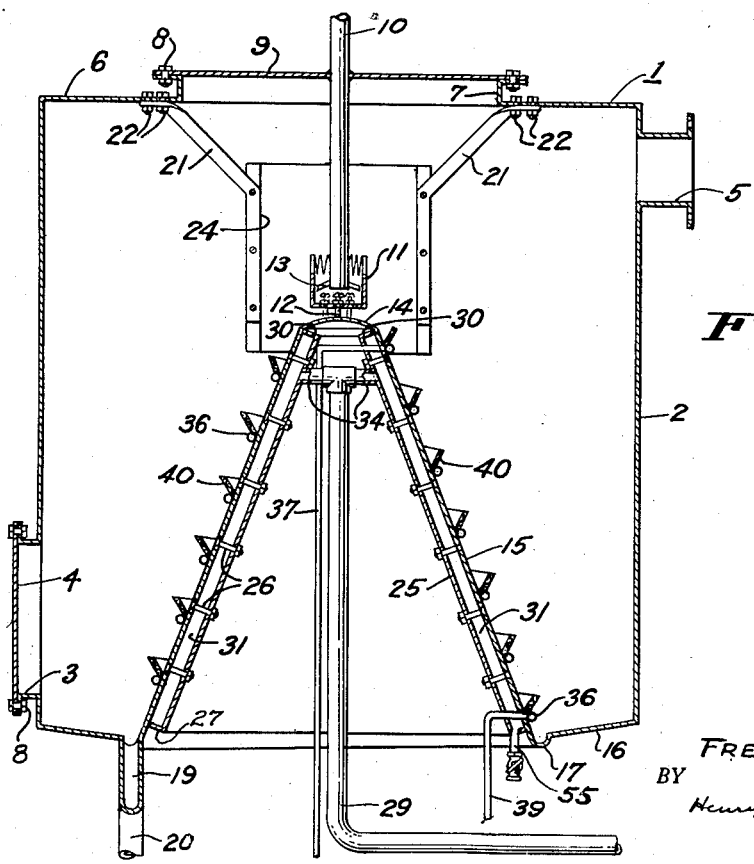
Fig. 2 is a side sectional view of the embodiment of Fig. 1 taken along line 2—2 of that figure.
Figure 3:
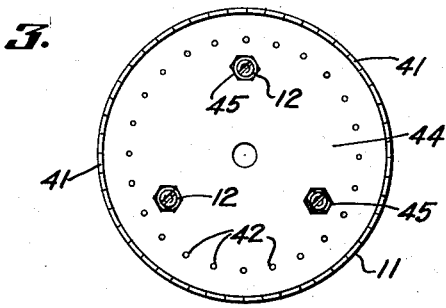
Fig. 3 is a top view of the feed crown.
Figure 4:
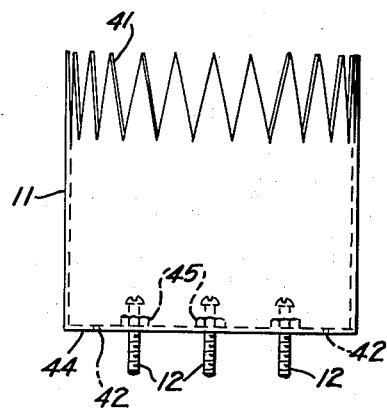
Fig. 4 is a side elevational view of the feed crown.

The presently preferred form of the device is illustrated in Figs. 1 and 2 of the drawings. The evaporator generally is denominated as 1 and comprises a cylindrical outer wall 2 having a lower port 3 closed by a cover plate 4 and an upper port 5 formed therein. The upper end of the chamber within wall 2 is closed by a top plate 6 having a central port 7 formed therein and closed in turn by a closure plate 9. A feed pipe 10 is disposed axially of chamber 2 through the closure plate 9, and has surrounding it at its lower end a crown-shaped feed member 11. This crown-shaped member is illustrated in larger scale in Figs. 3 and 4 and will be referred to hereafter simply as the "feed crown," or the "crown." Suitable means, such as bolts 8, are used to secure the cover plates 4 and 9 in position.

Crown 11 is adjustably supported by means of three spaced bolts 12 on the cap 14 forming the upper end of a truncated conical evaporator surface 15, which will be called the "cone" hereafter.

The lower end of chamber within wall 2 is closed by an annular, inwardly sloping bottom 16 having a drain or gutter 17 formed therein surrounding and connected to the bottom of the cone 15. Part of the gutter 17 may be deepened to provide a more capacious collection sump at or near 19, to which is connected a drain pipe 20. The plane of gutter 17 is sloped to drain to sump 19 and pipe 20.

Supporting straps 21 secured to top plate 6 by suitable means, such as bolts 22, carry a cylindrical sleeve 24. Sleeve 24 is disposed coaxially with feed pipe 10 about crown 11, and the upper portion of cone 15. While the sleeve 24 is open at each end, it separates the crown 11 and the upper end of cone 15 somewhat from the remainder of chamber within wall 2.

Within cone 15, a frusto-conical inner cone 25 is congruently disposed, being intimately connected to cone 15 by a number of staybolts 26. This inner cone 26 is joined to the underside of surface 15 by flanges or welds 27. Thus, the cone 15 and inner cone 25 define an inner frusto-conical chamber 31. Steam (preferably under pressure) is led to the upper portion of chamber 31 by a main steam feed pipe 29 and transverse feed pipes 34 connected thereto and opening through the wall of inner cone 25. The steam passes downward through the chamber 31, heating the outer cone 15 over which oil dissolved or partially dissolved in solvent is flowing, condenses and collects near the bottom flange 27, which slopes toward the drain or discharge outlet 55.

On the outside of cone 15 is disposed a spiral auxiliary steam coil 36, into which steam (preferably under pressure) is fed at the top through an auxiliary feed pipe 37 which may be connected to the main steam pipe 29. The condensate and used steam discharge from coil 36 is led into the discharge pipe 39. The steam coil 36 is preferably raised slightly from the surface of the cone 15 at the upper portion in order that it may assist in breaking up bubbles and return the material to the film. Immediately above the spiral pipe 36 and in contact therewith throughout its length is disposed at substantially 45° to the surface of cone 15, a strip of non-corrosive metal screen 40, which may be 28 mesh in the upper portion of pipe 36 and 18 mesh in the lower coils thereof. Obviously baffles may be of any suitable order depending upon the type of solvent recovery or liquid separation.

In operation, steam is conducted into the annular chamber 31 and the spiral coil 36 so that the entire unit is heated to the desired temperature, and the fractionated oils dissolved or partially dissolved in solvent are fed in through oil feed pipe 10.

The oil solvent mixture feeds on to the surface 15 evenly through holes 42 in the bottom plate 44 of crown 11, but since these holes are small they are not sufficient to take the entire feed hence the excess rises within crown 11 until it passes out over a plurality of evenly spaced V-shaped notches or weir openings 41, flowing down the outer surface of the crown and onto the cap 14. This provides a more even distribution of material to form a film than has yet been devised. The feed pipe 10 may be provided with a splash plate 13 at its outlet end.

Lock nuts 45 are provided on the bolts 12 by means of which the crown 11 may be adjusted to exactly level position and securely maintained therein to provide even distribution of the material being fed. The use of the weir-type notches 41 permits very accurate control of the distribution of oil-solvent material evenly over the cone 15, while the total flow is readily controlled by suitable valves (not shown) in the line to supply pipe 10, or by a constant feed pump.

As the oil-solvent material flows down over cone 15, it is heated by the steam in chamber 31 and pipe 36, causing the solvent to vaporize. The use of the conical shape for the evaporating surface is desirable because it helps to spread the material in a very thin layer over the heating surface. Prior to this time, it had been found difficult to separate bubbles of solvent vapor from the oil. The surface tension of the oil film is so great that unless it is spread out very thin, the occluded vapor is expelled with difficulty, if at all. The thinner this film is stretched by the increasing area of the surface over which it creeps downward, the easier the bubbles are broken and the solvent vapor freed from the oil. It will be seen that as the oil-solvent mixture flows downward over the cone 15 the increasing circumference gives a larger surface area for the initial amount of material. The surface tension of the mixture holds it in a continuous film thereby thinning the film as it proceeds downward.

The screen 40, forming a spiral baffle which may be made of material such as "stainless steel" or that known by the trade name "Monel," intercepts the creeping film of oil a number of times. Any suitable metal may be used but it should be one which is unreactive with respect to the type of material treated. Conveniently, there may be used some 9 turns about the cone 15, and as the material travels onward it passes through the screen 40 for the additional breaking up of the film and release of the vaporized solvent. The auxiliary steam coils 36 supply a concentration of heat at an important point and together with the screens 40 assist the process by breaking up the bubbles, returning the material to the film and further stretching.

It is also contemplated as part of the present invention to construct the truncated cone entirely of the coil 36 making a beaded surface (in section) for accomplishing similar results. In this event the steam from pipe 29 would connect directly with the coil 36.

The solvent, once freed from the oil, rises in the chamber within wall 2 and is drawn off the upper port 5 by any suitable line and by means not shown, and conveyed to suitable condensing equipment. Under some circumstances the vapor pressure alone is sufficient to carry it to the condensers. The condensing equipment, which is likewise not shown, in this application, may be of any conventional design, and is used solely to return the solvent vapor to a liquid state for subsequent re-use or storage.

The oil, now free from solvent collects in the drain or gutter 17, flows by gravity into sump 19, and is carried off by the oil outlet pipe 20 for storage or additional treatment as required.

It will be observed that access may be readily obtained to the interior of the chamber formed by wall 2 for cleaning, inspection, or repair, through the lower port 3 by removing the port cover plate 4. Access is also available through the upper port 7 by removing cover plate 9 and main oil-solvent feed pipe 10.

It will also be apparent that the sleeve 24 prevents the bulk of the solvent vapor from coming into contact with the most concentrated portion of the oil-solvent material adjacent to the crown 11. At the same time, the large capacity of the chamber within wall 2 prevents possible back pressure on the exhaust system through port 5.

It will be obvious to those skilled in the art that the construction of the parts described should be of sufficient strength to retain a substantial head of steam, as pressures of the order of 150 lbs. p. s. i. and higher are used.

Other mediums than steam and pressure may be used to heat the surface 15. For example, hot oil may be circulated in the chamber 31 and through the coils 36 providing a wide range of temperature at normal pressures.

Figure 5:
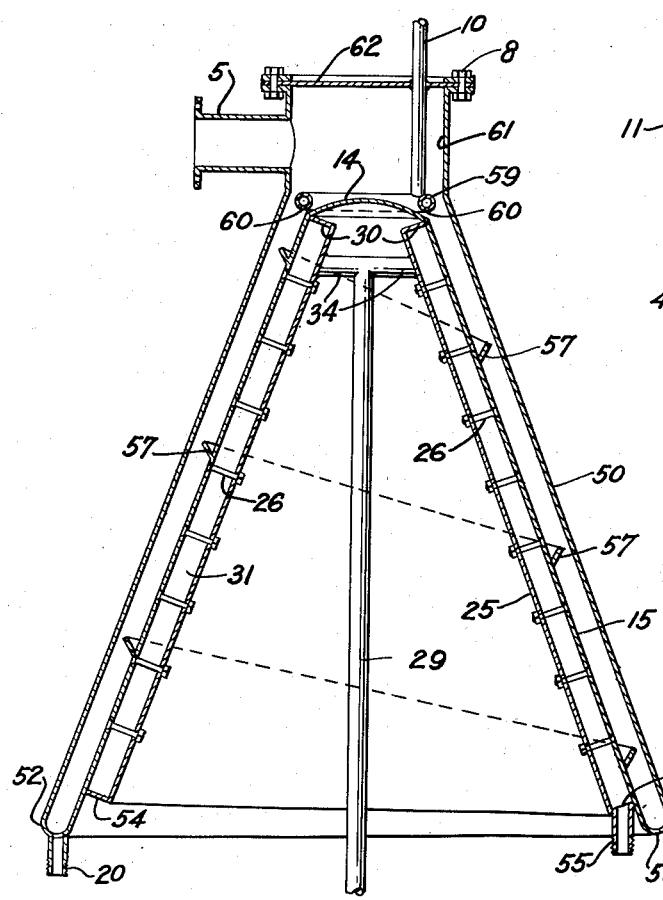
Fig. 5 is a side sectional view of a modified form of the invention.
Figure 6:
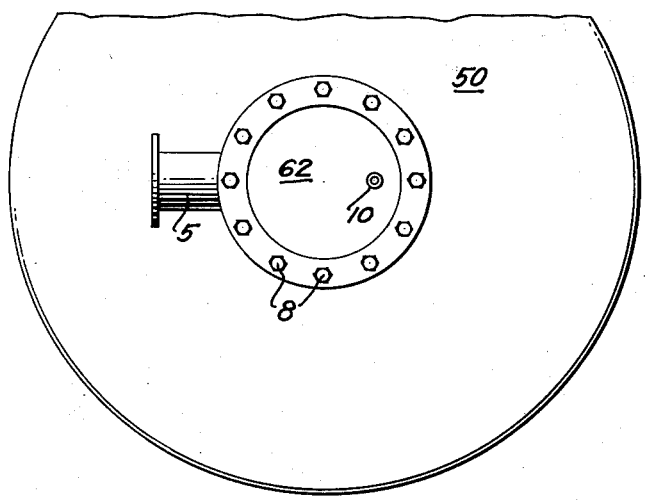
Fig. 6 is a top view of the same embodiment of the invention.

In Figs. 5 and 6, a modified embodiment has been set forth in which the cylindrical wall 2 of Figs. 1 and 2 is replaced by a frusto-conical outer shell 50. The outer shell 50 is substantially congruent with cone 15, and is joined thereto at the bottom, the juncture 51 constituting the gutter and drain for the oil. Juncture 51 is rounded and sloped toward one side 52, so that the solvent-free oil may run off into drain-pipe 20.

The cone 15 is joined to inner cone 25 not only by the annular closure plate 30 at the top, but also by a sloped bottom annular close plate 54, so that the annular jacket space 31 is confined at both top and bottom.

Steam is fed in at the top of jacket 31 by the same type of feed pipe 29 with transverse branches 34 in the first embodiment. Any condensate collecting on the sloped annular bottom plate 54 drains to the pipe 55 made in the lowest portion 56 of plate 54, which pipe is the steam outlet.

A spiral baffle 57 extends outwardly from the surface of cone 15 to interrupt the oil flow and break up the bubble formations as the oil and solvent material flows downwardly thereover and therethrough if the baffles permit. The oil-solvent material is here fed onto the cap 14 and upper portion of cone 15 by an oil feeding ring 59 attached to oil feed pipe 10 and pierced by a plurality of spaced apertures 60.

Outer shell 50 is joined at its upper end to a cylindrical head chamber 61. The top of chamber 61 is closed by a closure plate 62 through which oil feed pipe 10 passes, the plate 62 being secured to chamber 62 by the usual bolts 8. Outlet port 5 is led into the wall of chamber 61 for connection to the solvent removing system, as in the prior embodiment. It will be observed that in this embodiment the solvent vapor is guided by the outer shell 50 upwardly into the head chamber 51 from which it is drawn out for condensation.

Figure 7:
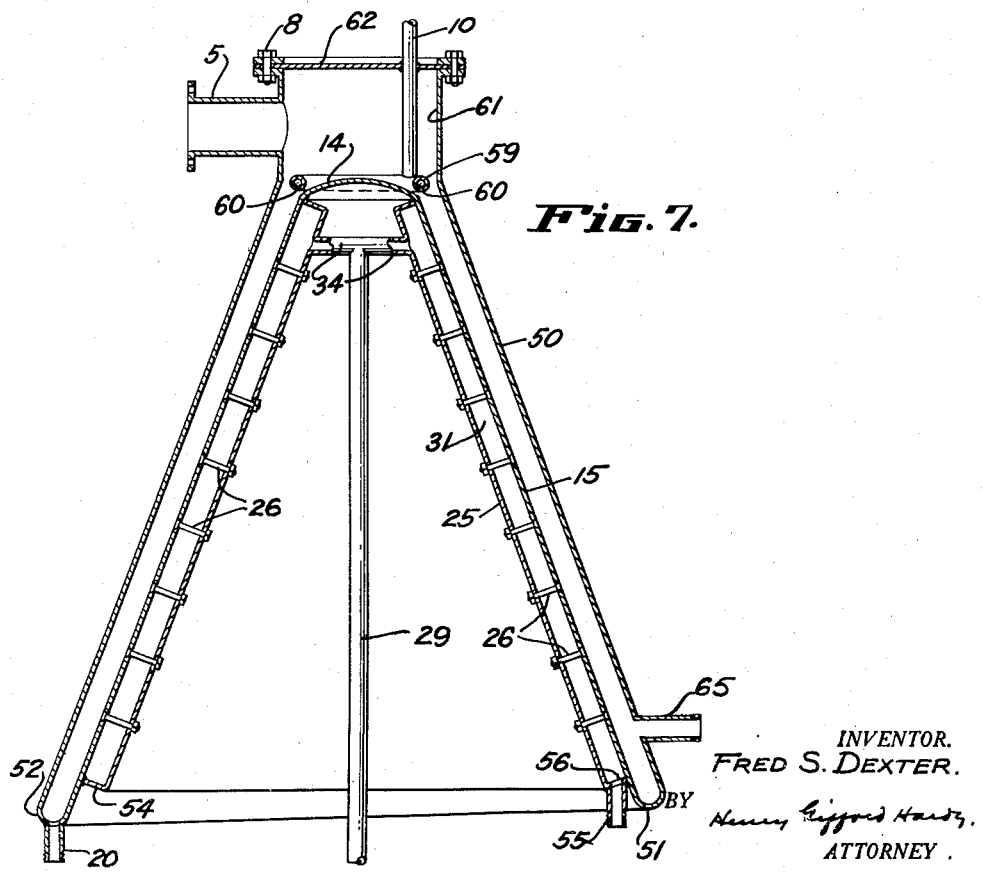
Fig. 7 is a side sectional view of another embodiment of the invention.

In Fig. 7 there is set forth a further embodiment in which the design has been simplified further and in this embodiment, the outer shell 50 is the same as shown in Fig. 5, and the top portions are identical for the two embodiments, being shown in Fig. 6. The baffles and screens of the prior embodiments have been omitted, however, and reliance is placed on the adjustment of the proper rate of oil-solvent material flow and the spreading thereof over the continually increasing area of cone 15 as the solution flows downwardly to produce the thin layer required for the expulsion of the acetone vapor by the steam heat from jacket chamber 31.

It will thus be seen that the invention set forth above provides means for readily evaporating solvent from oil fractions which have been dissolved and partially dissolved therein. The material is spread by gravity flow over a surface which increases in area with a consequent reduction in thickness of film. The material is heated by intimate contact with the heated cone surface to cause solvent evaporation. The film is broken up in the preferred form by screens and baffles which free the bubbles of vaporized solvent from the tenacious oil film. The vapor is drawn off and condensed for re-use, while the oil is handled as desired.

Referring again to Fig. 7, there is shown a further and important variation in the process. As the material passes downward on cone 15 a counter current of inert gas or steam may be provided through the inlet 65. This counter current contacts the thin film in order to preclude oxidation at the surface or to assist in carrying away any reaction products formed. It is also a part of the present invention that such a counter current of gas may be used to produce a reaction at the surface of the film.

In a broader aspect it is easily seen that the device is capable of separating immiscible liquids, two or more, using the differences in boiling points by controlling the temperature and pressure of the heat exchanger and of the reaction chamber respectively. Once it is possible to obtain a satisfactory thin film continuously there is great flexibility of reactions by control of temperatures and pressures and by the use of counter currents.

I claim:

1. In a device for separating a solvent from oil dissolved or partially dissolved therein, in combination, a cylindrical chamber, a drain from the lower portion of said chamber, a vapor line connected to the upper portion thereof, a frusto-conical surface disposed within said cylindrical chamber, a steam chamber formed under said surface, a steam feed and exhaust line connected to said steam chamber, a spiral screen disposed about said surface at an acute angle thereto, a spiral steam coil disposed in contact with said screen and connected to said steam chamber lines, and a feed member arranged to distribute said oil mixture over said surface in a thin layer.

2. In combination with a device substantially as described in claim 1, a feed member, comprising a cylindrical wall, a perforated bottom closing said cylindrical wall, uniform serrations formed in the upper edge of said wall, and lockably adjustable supporting legs extending from said bottom.

3. The method of separating mixtures of viscous oil and solvent including the steps of evenly distributing at the start and flowing a film of said mixture over a smooth surface which progressively increases in area, periodically interrupting and breaking up the bubble formations of said flow adjacent said surface, heating said surface during said flow as well as separately heating the film at the points of interruption to vaporize said solvent, collecting and condensing the same, and collecting the oil substantially freed of solvent at the end of the flow.

4. The method of separating mixtures of viscous oil and solvent including the steps of evenly distributing at the start and flowing a film of said mixture over a smooth surface which progressively increases in area, heating said surface to vaporize the said solvent, passing a counter-flow of inert gas over and in contact with said flow, baffling and eliminating the bubble formations without materially interrupting the course of said flow and at the same time providing an even distribution of the film over said surface, heating said baffle points during said flow to further vaporize said solvent, collecting and condensing the vaporized solvent and collecting the said oil substantially freed of solvent at the end of the flow.

5. A device for separating an evaporable solvent from a heavy viscous oil comprising, an outer vapor chamber, a smooth frusto-conical surface having a cap formed at the small end of said surface within said chamber, a heating chamber disposed beneath said surface, an oil drain connected to said chamber at the larger end of said surface, a take-off line connected to said vapor chamber, an oil and solvent feed line extending into said vapor chamber and adapted to feed onto said frusto-conical surface at the cap, and a spiral baffle of perforated screening disposed about said frusto-conical surface across the path of flow to eliminate bubble formations and to insure an even distribution of the feed oil in the path of flow.

6. In a device for removing an evaporable solvent from a heavy viscous oil, in combination, a cylindrical vapor chamber and within said chamber a feed device arranged to deliver and symmetrically distribute a film of oil containing solvent to a smooth surface, a smooth surface adapted to receive said film and increasing in area downwardly from the point where the film is received, a heating chamber disposed under said surface, means disposed about said surface intercepting the path of flow arranged to eliminate bubble formations and prevent channeling of the film without preventing the flow thereof, and supplemental heating means closely associated about said intersecting means to assure additional heat at the points of intersection.

FRED S. DEXTER.